(12) United States Patent
Cadaval Fernandez De Leceta et al.

(10) Patent No.: US 6,685,806 B1
(45) Date of Patent: Feb. 3, 2004

(54) MEMBRANE ELECTRODE ASSEMBLY AND METHOD OF ITS PRODUCTION

(75) Inventors: Alfonso Carlos Cadaval Fernandez De Leceta, Asua-Erandio (ES); Ricardo Blach Vizoso, Asua-Erandio (ES)

(73) Assignee: David Fuel Cell Components, S.L. (ES)

( * ) Notice: Subject to any disclaimer, the term of this patent is extended or adjusted under 35 U.S.C. 154(b) by 0 days.

(21) Appl. No.: 09/868,796
(22) PCT Filed: Dec. 22, 1998
(86) PCT No.: PCT/ES98/00351
§ 371 (c)(1), (2), (4) Date: Dec. 6, 2001
(87) PCT Pub. No.: WO00/38261
PCT Pub. Date: Jun. 29, 2000
(51) Int. Cl.$^7$ ............................................. C25B 11/03
(52) U.S. Cl. ........................ 204/283; 204/296; 204/252; 429/42; 429/41; 429/46; 429/30; 429/33
(58) Field of Search ................... 429/42, 46, 41, 429/30, 33; 204/283, 284, 296, 252, 278.5

(56) References Cited

U.S. PATENT DOCUMENTS 5,330,860 A    7/1994   Grot et al. ..................... 429/42
5,399,184 A    3/1995   Harada ........................ 29/623.4

FOREIGN PATENT DOCUMENTS

WO    9515016    6/1995

*Primary Examiner*—Bruce F. Bell
(74) *Attorney, Agent, or Firm*—Baker Botts LLP

(57) ABSTRACT

Membrane-electrode assembly consisting of a cationic exchange membrane which contains fluorine (made of hydrolyzed copolymer of tetrafluoro-ethylene and vinyl ether which contains perfluorosulfur with PE=900–1300) and porous layers of electrode material (made of electrocatalyst), inactive electroconductor material and fluoropolymer agglutinating material arranged on both surfaces of the cationic exchange membrane. The cationic exchange membrane which contains the fluorine is made of hydrolyzed copolymer of tetrafluoroethylene with vinyl ether which contains perfluorosulfur, having a crystallinity grade between 2 and 8%; porous layers of the electrode material are obtained which have a porosity comprised between 40 and 70% and decreasing in the direction of the cationic exchange membrane surface with a porosity gradient from 5 to 15% par $1\mu$. Said membrane-electrode assembly is used in fuel cells, in water electrolysis and in other electrochemical process.

7 Claims, No Drawings

MEMBRANE ELECTRODE ASSEMBLY AND METHOD OF ITS PRODUCTION

TECHNICAL FIELD

The present invention relates to the electrochemical industry in general, and more particularly to a membrane-electrode assembly ("MEA") based on fluoro-containing ion-exchange membranes and to a method for its production. Such MEAs are widely used in fuel cells, in water electrolyzers, and in other electrochemical processes.

BACKGROUND ART

MEA consisting of the fluoro-containing ion exchange membrane M174-SK™ (Russian trademark [RTM]) and of layers of an electrode material (electrode composition) situated on both sides of the membrane are already known. The electrode composition consists of a mixture of an electrocatalyst and an ion-exchange polymer [USSR patent 1,258,095 IPC S25V 11/10, 1990]. As an ion-exchange polymer in the electrode composition, an inorganic proton-conducting electrolyte (polyantimonic acid, acidic zirconium phosphate) is used. The electrocatalyst is platinum, palladium, or rhodium black.

MF-4 SK membrane is a 300 micron thick cation-exchange membrane ("CEM") made from a hydrolyzed copolymer of tetrafluoroethylene and a perfluorosulfur group-containing vinyl ether, having the following structural formula:

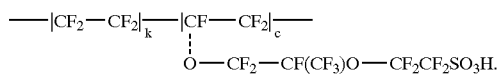

Our experiments showed that this copolymer has an equivalent weight (EW) of 1200 and a degree of crystallinity of 12%, as shown in control Example 1.

The MEA is produced by applying an electrode composition on both sides of the CEM. The sedimentation method is used. The electrode composition consists of a mixture of an electrocatalyst and an ion-exchange polymer (polyantimonic acid) powder. The composition is fixed by electric current treatment in water at 90° C., where the current density is 0.5–1 A/cm$^2$.

A MEA is produced that consists of, for example, CEM MF-4SK and layers of the electrode composition on both sides with an electrocatalyst (platinum black, size of particles 0.01 micron) on both the cathode and the anode sides. The MEA deionized water electrolysis has the following characteristics: the voltage is 2.2V when the current density is 1 A/cm$^2$, and the temperature is 100° C. The voltage does not change over a period of time of 1000 hours.

Advantageously, the MEA is stable over a period of time of 1000 hours.

The disadvantage of the MEA (USSR patent 1,258,095) is the impossibility to achieve high adhesion between layers of the electrode composition and CEM because the ion-exchange polymer (polyantimonic acid) is gradually dissolved after a long period of time (more than 1000 hours) of electrolysis of water. Consequently, over a long period of working with MEA, one can observe a tendency for exfoliation of the electrode composition. The method of the MEA production does not permit precise regulation of the composition and the amount of the electrode material applied to CEM. The method is complicated by the fact that layers of electrode composition (electrocatalytic layers) are applied by a method of sedimentation, which requires the following electric current characteristic to fix layers on CEM: a rather high electrocatalyst loading of 1–2 mg/cm$^2$ on the cathode and 4–6 mg/cm$^2$ on the anode.

A MEA with a porous cathode is also known. Such a MEA consists of a polymeric ion exchange membrane of Nafion® (trademark of CEM by Du Pont) type and a porous layer of an electrode material, a mixture of electrocatalyst particles and a binder (Russian Federation [RF] patent 2,015,207, IPC S25V 11/20, 1994), settled on the cathode side of CEM. The porous cathode layer of the electrode composition is made of a mixture of electrocatalytic particles and the binder, polytetrafluorethylene. The membrane (Nafion®) is produced from a hydrolyzed copolymer of tetrafluoroethylene and perfluorinated vinyl ethers containing ion-exchange groups. For water electrolysis of CEM (Du Pont) Nafion® 120 with —SO$_3$H ion exchanging groups, see Russian Federation patent H; see RE patent describing tetrafluoroethylene and perfluorinated vinyl ethers containing ion-exchange groups for water electrolysis of CEM (Du Pont) Nafion® 120 with SO$_3$ tetrafluoroethylene ion exchanging groups. The membrane (Nafion®) is produced from hydrol248, 5 American Chemical Society, Washington D.C.

The MEA mentioned above is produced by applying a mixture of electrocatalytic particles and inactive conducting material with the binder (polytetrafluorethylene) and aluminum powder on an aluminum sheet by technique A. After drying at 105° C., for example, sintering at 325° C. is carried out for 10 minutes. Then, the aluminum sheet with the layer of electrode material is placed on the cathode surface of CEM and pressed at 175° C. and a pressure of 50–60 kg/cm$^2$. After pressing, the MEA is dipped in a caustic soda solution to dissolve the aluminum sheet and aluminum powder (the latter is used as a promoter of porosity). Then, the layer of electrode material become porous. The advantage of the MEA of Russian Federation (RF) patent No. 2,015,207 is that MEA's lifetime increases because the binder (polytetrafluorethylene) does not dissolve during the electrolysis. When such MEA is used for water electrolysis, the cell voltage is 1.8–1.9 V.

The disadvantage of the MEA described above is that the adhesion between the applied porous layer of electrode material and the CEM surface is not as strong as required. During MEA tests of long duration, exfoliation of the porous layer of the electrode material occurs and the evolving gases are deposited at the surface between the CEM and the porous layer. This results in an increase of the MEA voltage. Moreover, as is shown in the Russian Federation patent (example 4), the disadvantage of the described MEA is a comparatively high electrocatalyst loading because of its particular capsulation by polytetrafluorethylene during production (pressing at 325° C. and a pressure of 50–60 kg/cm$^2$).

Moreover, the volume porosity of the electrocatalytic layer of the electrode material is uncontrollable, so the transport of gases and liquids in the reaction zone is impeded and the electrochemical properties of the MEA worsen.

The manner of producing the described MEA is rather complicated, because high temperature (>300° C.) sintering and aluminium lixiviation to form the porous layer of an electrode material are required. Moreover, production of the MEA by pressing at 175° C. leads to the particular destruction of cation-exchanging groups that worsens CEM electrochemical characteristics and may destroy the whole MEA.

The art having an essential set of attributes closest to the claimed MEA and its method of production is the MEA, and the method of its production, described in U.S. Pat. No. 5,399,184 HOIM 8/10, 1995. U.S. Pat. No. 5,399,184 discloses an MEA that consists of a fluoro-containing cation-exchange membrane made of a tetrafluoroethylene hydrolyzed copolymer and a fluorosulfur group-containing vinyl ether, with an exchange capacity of 0.83–1.43~meq/g (as described in the specification) or 1.12–1.43 meq/g (as described in the patent's Examples and Claims), which corresponds to an EW of 900–1300, and discloses porous layers of an electrode material situated on both of its surfaces. These layers are made of a mixture of an electrocatalyst with an inactive electroconducting material and a fluoropolymer binder. The fluoropolymer binder is a cation-exchange fluoropolymer with a composition identical to the membrane polymer, or may be polytetrafluorethylene. The CEM is made of a hydrolyzed copolymer of tetrafluoroethylene with a perfluorsulfur-containing vinyl ether. Its structural formula is:

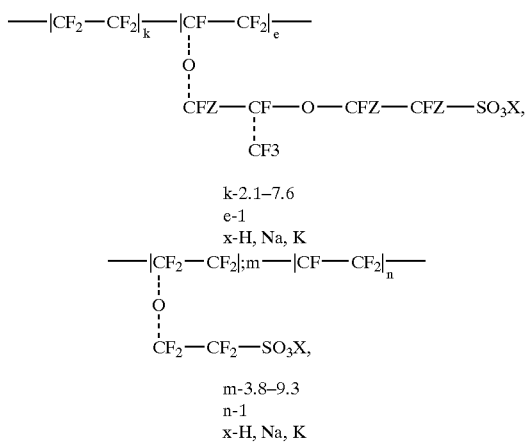

For example, it may be CEM produced by Du Pont—Nafion® 117. This membrane is made of a copolymer with a degree of crystallinity of 12%. [ACS Symposium Perfluorinated Ionomer Membranes, Lake Buena Vista, Fla. Feb. 23–26, 1982, Series 180, pp 217–248, American Chemical Society, Washington D.C.]

The MEA specified by prototype (U.S. Pat. No. 5,399,184) is produced by application of the paste of electrode material on the both surfaces of the CEM. The latter consists of the hydrolyzed copolymer of tetrafluoroethylene with the perfluoro-containing vinyl ether (EW=900–1300). The paste is made of a mixture of inactive electroconducting material (carbon) and an electrocatalyst (platinum) with a fluoro-containing copolymer binder (with 5% solution of cation-exchange fluorocopolymer which has a composition close to the fluorocopolymer which CEM is made of from a 50% dispersion of polytetrafluorethylene in aliphatic alcohol). The paste is applied onto one of the CEM surfaces and then onto the other surface (with a subsequent thermal treatment). When a 5% solution of the cation-exchange fluoropolymer (Nafion® Solution) is used as the binder with —$SO_3H$ ion-exchange groups (see U.S. Pat. No. 5,399,184, Example 1), the paste is treated with a 5% solution of potassium hydroxide in water before application to the CEM to transform the ion-exchange groups in —$SO_3K$ groups. The paste is spread on one of the CEM (with —$SO_3K$ groups) surfaces in such a way that the layer of an electrode material after drying is not more than 10 microns thick. Then the paste is dried at room temperature for 10 minutes and then under vacuum for 30 minutes to remove the solvent. Then the CEM with the paste is placed between polytetrafluorethylene sheets and pressed at 190° C. at a pressure of 50 kg/cm². Then an analogous layer of an electrode material is placed on the other surface of the membrane by the same procedure. Then MEA is dipped in a 5% sulfuric acid solution at room temperature for 16 hours to convert ion-exchange —$SO_3K$ groups to —$SO_3H$ groups.

When a polytetrafluorethylene 50% dispersion as fluoropolymeric binder is used in an electrode material (see example 5 of U.S. Pat. No. 5,399,184), the paste of electrode material is applied to a sheet of carbon material, then the sheet is heated at a temperature of 325° C. for 10 minutes under pressure. The second sheet is produced in the same way. The electrode material's layers, which were applied to sheets of carbon material, are then covered with a 5% solution of "Nafion® Solution" containing groups —$SO_3H$ and then dried. Then carbon sheets are placed on the CEM's surface (with sides which are covered with an electrode material facing the CEM) and pressed at a temperature of 135° C. and a pressure of 140 kg/cm² for 60 minutes. The MEA produced by the described method has porous layers of electrode material on the surfaces of the CEM.

MEA produced by the prototype (U.S. Pat. No. 5,399,184) is pressed with a carbon cloth of paper saturated with polytetrafluoroethylene on both sides and put into a fuel cell. The voltage of the fuel cell in example 1 is 0.75–0.77 V and the current density is 0.5 A/cm²; in example 5 the voltage is 0.75–0.8 V and the current density is 0.5 A/cm². The MEA produced can be used not only in fuel cells but also in electrolysis of water.

The disadvantages of the prototype MEA are:

1. Not enough high electrochemical characteristics especially at low electrocatalyst loading. The reason is the low and uncontrolled porosity of the electrode material layers and the high degree of crystallinity. Uncontrolled and low porosity of the electrode material are due to the fact that the porous electrode material layer is formed at a rather high temperature of 190–340° C. and a pressure of 50–120 kg/cm². Our experiments showed that such electrode material layer's porosity is about 35% (see our control example 2).

Such conditions of MEA production result in deformation and collapse of pores, both those which are in CEM and those which were formed in the electrode material. A local collapse of the membrane can occur. Low and uncontrollable porosity of the electrode material layers and high degree of crystallinity make difficult the reactant supply and the removal of reaction products, and also make difficult achievement of the necessary water balance in MEA. This is the reason for the relatively high MEA resistance and overvoltage on electrodes, finally resulting in fuel cell low voltage to high electric power consumption if MEA is used in water electrolysis. Additionally, partial capsulation of the electrocatalyst with the fluorobinder occurs, which decreases the efficiency of the electrocatalyst and increases its consumption.

2. A not high adhesion between the catalytic layer and CEM decreases the MEA's lifetime. One reason for the decreased lifetime is the long processing of the MEA with a solution of sulfuric acid which results in significant swelling of catalytic material layers. Another cause for the decreased lifetime is the different degree of swelling of the porous catalytic layer and of the CEM. All this leads to the exfoliation of catalytic material layers when MEA operates during a long time period (Journal of Applied Electrochemistry 22 (1992) pp. 1–7). Such processing with sulfuric acid is necessary if the same cation-exchange copolymer (with —SO$_3$K groups) as CEM's copolymer is used as the fluoropolymeric binder.

When polytetraethylene is used as a polymeric binder it is almost impossible to reach a uniform distribution of the electrocatalyst because discrete solid lumps of polytetraethylene are usually obtained. These lumps block the surface of CEM and of the electrocatalyst, thus areas on the surface of CEM that are fully covered by polytetraethylene are created, such that liquid and gaseous reactants of the reaction cannot penetrate these areas. The existence of such areas in MEA contributes to the exfoliation of the electrode material layer from the CEM's surface and the deterioration of electrochemical characteristics.

The disadvantages of MEA production by the prototype are that it is a multistage (6–7 steps) process of long duration. The MEA processing with the solution of sulfuric acid takes about 16 hours, in itself.

DESCRIPTION OF THE INVENTION

The technical result which is achieved by the claimed MEA includes the improvement of electrochemical characteristics of MEA (especially at low catalyst loading), an increase in efficiency of the electrocatalyst usage, and an increase in the lifetime of the MEA.

The claimed method of MEA production permits one to more simply make the process, reduce its duration, and ensure the production of MEA with high electrochemical characteristics.

The mentioned technical result is achieved by using a fluoro-containing cation exchange membrane ("CEM") made of a hydrolyzed copolymer of tetrafluoroethylene with a perfluorosulfur-containing vinyl ester and optimally with a third modifying comonomer, which has a degree of crystallinity of 2–8%, and porous layers of electrode material are produced with porosity 40–70%, decreasing in the direction to the surface of CEM with a gradient of porosity S-1 between 5 and 15% per 1 micron. The MEA consists of a fluoro-containing CEM made of a hydrolyzed copolymer of tetrafluoroethylene with a perfluorosulfur-containing vinyl ether having an EW of 900 to 1300 and porous layers of electrode material made of a mixture containing an electroconducting inactive material and a fluoropolymeric binder located on both surfaces of CEM.

CEM can be produced of hydrolyzed copolymer tetrafluoroethylene with perfluorsulfur-containing vinyl ester and the third modifying comonomer which can be chosen from ethylene, perfluor-2-methylen-4-methyl-1,3-dioxalan and perfluoralkyled vinyl ether with C1–C3 alkyl-group.

| Porous layers of electrode material are made of mixture containing (in mass %): | |
|---|---|
| electrocatalyst | 20–85% |
| Electroconducting inactive material | 10–60% |
| Cation-exchange fluorcopolymer identical to fluorcopolymer of which CEM is made | 2–8% |
| Polytetrafluorethylene | 3–15% |
| or layers of electrode material are produced of mixture containing (in mass %): | |
| electrocatalyst | 65–95% |
| Electroconducting inactive material | 1–35% |
| Cation exchange fluorcopolymer identical to fluorcopolymer which CEM is made of | 1–9% |

The process simplification and reduction of its duration is achieved by using a CEM produced of hydrolyzed copolymer of tetrafluoroethylene with perfluorsulfur-containing with a degree of crystallinity of 2–8% for MEA production. The method includes application of electrocatalyst, inactive electroconducting material with fluor-containing binder mixture onto both surfaces of fluor-containing CEM, which is produced of hydrolyzed copolymer of tetrafluoroethylene with perfluorsulfur-containing vinyl ester with EW=900–1300 with the subsequent thermal treatment. Mixture of electrocatalyst, inactive electroconducting material and 1–5% solution of cation-exchange fluorcopolymer identical to fluorcopolymer of which CEM is made is applied in an organic solvents mixture to the both surfaces of CEM. Heattreatment is carried out with a multistage increase of temperature: from 20–35° C. to 80–100° C. Another CEM can be used; for example, CEM produced of hydrolyzed copolymer of tetrafluoroethylene with perfluorsulfur-containing vinyl ether and the third modifying comonomer which can be chosen from ethylene, perfluor-2-methylen-4-methyl-1,3-dioxalan and perfluoralkyled vinyl ester with C1–C3 alkyl-group. A mixture of electrocatalyst, inactive electroconducting material and a 1–5% solution of cation-exchange fluorcopolymer identical to the fluorcopolymer of which CEM is made can be applied, in an organic solvents mixture, to both surfaces of CEM.

The inventors of the present invention discovered that a degree of crystallinity of the hydrolyzed cation exchange fluorcopolymer (from which the cation exchange membrane is made of) has a great influence on the electrochemical characteristics of MEA. When the degree of crystallinity of fluorcopolymer is equal to 2–8% there is such water balance in MEA volume which provides necessary inlet of the reagents in MEA and the outlet of the products of the reaction. The degree of crystallinity results in optimum electrochemical characteristics of MEA.

The degree of crystallinity of fluorcopolymer that is used in MEA may be controlled by: (1) the conditions of its synthesis; (2) addition of the third comonomer; (3) the conditions of the hydrolysis when copolymer is transforming from a nonionic form into cationic exchange form. An increase in the degree of crystallinity above 8%, as well as a decrease in the degree of crystallinity below 2% result in a deterioration of the electrochemical characteristics of MEA.

Formation of the layer with porosity that decreases in the direction of cation-exchange membrane with a porosity gradient of 5–15% per 1 $\mu$p improves the electrochemical characteristics of MEA. Such porosity is achieved when the layers of an electrode material are applied to the membrane surface containing fluorcontaining binder dissolved in a mixture of organic solvents with different boiling points (preferably as a 1–5% solution). The binder is a fluorcopolymer which is identical to the fluorcopolymer from which the membrane is made. Such combination of the fluorcopolymer with the mixture of solvents, together with removal of the solvents during a multistage increase of the temperature from 20–35° C. to 80–100° C., provides the necessary porosity gradient, with general porosity preferably 40–70%, without the need to use any special methods to obtain it.

If the heat treatment is carried out at more than 100° C., the necessary porosity could hardly be controlled and the porosity gradient 5–15% could hardly be reached. To carry out the heat treatment at lower than 20° C. is unexpedient because formation of the electrode layer slows, and therefore reaching the porosity gradient 5–15% is impeded.

When a cation-exchange fluorcopolymer (that is identical to fluorcopolymer from which CEM is made), together with solvents in which CEM fluorcopolymer swells well, is used as a binder of an electrode material, strong adhesion between the layer of an electrode material and CEM could be reached. When comparatively mild conditions of heat treatment (not more than 100° C. without any pressure) are used to produce MEA, not pressing of an electrode material in CEA surface but gluing them together takes place when they are combined. Under the mentioned mild conditions of MEA production, the decomposition of fluorcopolymer cation exchange groups does not occur, such that the CEM is not damaged, and the electrochemical characteristics of the CEM do not worsen.

At the claimed MEA, the cation-exchange membrane can be made of hydrolyzed copolymer of tetrafluoroethylene with perfluorsulfur-containing vinyl ethers with the following structural formula:

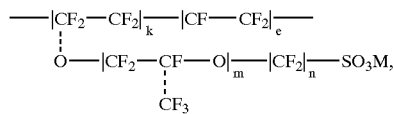

M = H$^+$; Na$^+$; K$^+$; Li$^+$
m = 0–1
n = 2–5 k = 100-a% mol
e = 10.4–17.58% mol The third modifying comonomer at the mentioned fluorcopolymer could be ethylene, perfluor-2-methylene-4-methyl-1,3-dioxalane, perfluoralkylvinyl ether (with $C_1$–$C_3$ in alkyl). The modifying comonomer is brought at the copolymer during the synthesis at the amount of 1–5%, mnllPthvlenP-3-5 moL perfluor-2-methylene-4-methyl-13-dioxalane-1–4% mol; perfluoralkyl ethers with $C_1$–$C_3$ in alkyl-2–5%).

The anologous hydrolyzed copolymers of tetrafluoroethylene with perfluorsulfur-containing vinyl ethers with the above structural formula are described at the mentioned above analogues, in the prototype, and at RF patent No. 2,077,373 (IPC 6VOID 61/00,1997).

Copolymers (CPL) which were used in the following examples of the realization of the invention were synthesized by the inventors. The structural formulae are:

1. CPL-1

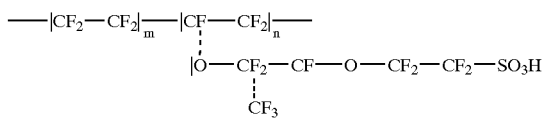

m = 89.6% mol
n = 10.4% mol

2. CPL-2

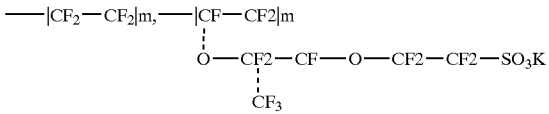

m = 88.3% mol
n = 11.7% mol

3. CPL-3

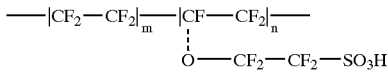

m = 82.42% mol
n = 17.58% mol

4. CPL-4

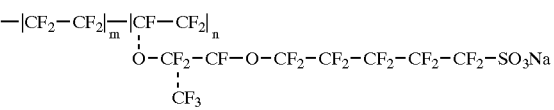

m = 85.9% mol
n = 14.1% mol

5. CPL-5

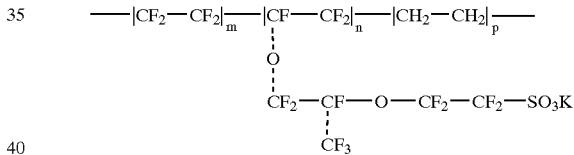

m = 84.8% mol
n = 12.2% mol
p = 3.0% mol

6. CPL-6

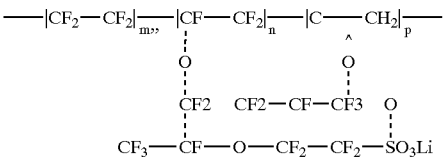

m = 79.5% mol
n = 15.5% mol
p = 5.0% mol

7. CPL-7

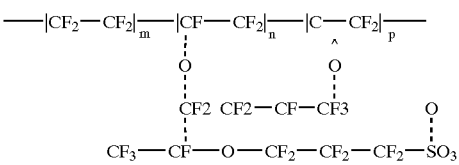

m = 88.0% mol
n = 11.0% mol
p = 1.0% mol

8. CPL-8

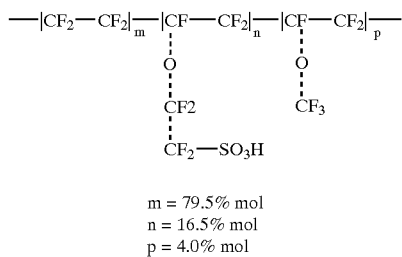

m = 79.5% mol
n = 16.5% mol
p = 4.0% mol

9. CPL-9

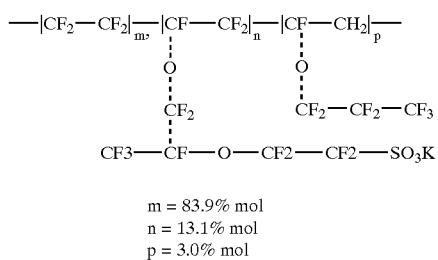

m = 83.9% mol
n = 13.1% mol
p = 3.0% mol

The layer of an electrode material which is applied on the anodic surface of the CEM as an electrocatalyst may contain platinum, iridium, $IrO_2$, mixed oxides $IrO_2+RuO_2$, $IrO_2+RuO$, $+TiO_2$, $IrO_2+RuO_2+SnO_2$, $PbO_2+IrO_2$ and others.

The layer of an electrode material which is applied on the cathodic surface of the CEM as an electrocatalyst may contain platinum, palladium, or platinum with ruthenium, etc.

The layer of electrode material may contain an inactive electroconductive material such as, carbon, lead, lead dioxide, etc.

It is expedient to use polytetrafluorethylene F-4D (RTM) (Russian national standard (RNS) 1496-77) in the composition of an electrode material.

Fluorpolymer binder in the composition of an electrode material is a fluorcopolymer with the composition identical to the fluorcopolymer from which the CEM is made. The binder is used as a 1–5% solution in a mixture of organic solvents with different boiling points. The composition of the mixture depends on: (1) the composition of the copolymer its equivalent weight, and (2) the type of cation-exchange group (—$SO_3H$; —$SO_3K$; —$SO_3Na$—$SO_3Li$) that is included in it.

Moreover, the mixture must contain such solvents that there would not be any coagulation of the system when the solution of cation-exchange fluorcopolymer is combined with the electrocatalyst and inactive electroconductive material. The mixture of organic solvents must include the solvents with low boiling point 20–60° C. (1,1,2-trifluor-1, 2,-dichloroethane (freon 123); pentane; 1,1,-difluor-1,2-dichloroethene (freon-132B); 1,1,2-trifluorotrichloroethene (freon 113); 1,1,1-trichlorobromidoethane (freon-123B); acetone etc.), solvents with middle boiling point 60–100° C. (1,1-difluoro-1,2,2-trichloroethane (freon 122); ethanol; hexane; methyl ethyl ketone, benzene, isopropanol; N-propanol; heptane etc.) and solvents with high boiling point 100–160° C. (isobutanol; N-butanol; toluene; dimethylformimide; ciclohexanone etc.).

If the fluorcopolymer contains cation-exchange groups such as —$SO_3H$ group, then the mixture of ethanol with freon-113 and methyl ethyl keton preferably can be used. If there are $SO_3K$ groups, then dimethylformamide mixed with ethanol and heptane preferably can be used. For copolymer with —$SO_3Li$, groups the mixture of isopropanol with acetone and freon-123B may be used.

The solution of cation exchange fluorcopolymer is obtained by dissolving the cation exchange fluorcopolymer powder in a mixture of organic solvents then heating and stirring the solution. The dissolving temperature depends on the composition and equivalent weight of copolymer, and also on the boiling points of the solvents used.

The properties of the fluorcopolymer from which the CEM is made and the properties of the MEA were determined in the following way:

1. The composition of the fluorcopolymer was determined by infrared spectroscopy using a Perkin-Elmer, 1750 spectrometer.
2. The exchange capacity was determined by titration [RNS 17552-72 and technical conditions (TU) 6.06-041-969-89].
3. The degree of crystallinity was determined by X-ray method using X-ray spectrometer KRM-1.
4. The membrane thickness and the thickness of the layers of an electrode material were determined using the micrometer MK 25-1 (RNS 6507-78).
5. The general porosity and the porosity gradient were determined by the method of ethalone (standard) porometry.

The following examples illustrate the present invention.

EXAMPLE 1

CEM 150 mm in diameter and thickness of 170~microns made of hydrolyzed copolymer tetrafluoroethylene with perfluorsulfur-containing vinyl ether (CPL-1) with a degree of crystallinity of 8%, EW=1200, with cation-exchange groups —$SO_3H$, is used to produce MEA.

Production of an Electrode Material 0.24 g of electrocatalyst (platinum) deposited on the surface of 0.58 g inactive electroconductive material (acetylent black with size of particles 0.01 micron (TU 14-7-24-80)) are mixed in a glass vessel with 0.1 g of polytetrafluorethylee and 0.08g of fluorcopolymer CPL-1 as a 3% solution in the mixture of ethanol, freon-13, and methyl ethyl ketone (mass ratio 5:2:3). The fluorcopolymer contains —$SO_3H$ cation exchange groups, and it is identical to the CEM copolymer. The obtained viscous compound is applied on one of the air-dried surfaces of the CEM by spraying a layer of such thickness, that after drying the electrocatalyst loading would be not more than 0.3 $\mu g/cm^2$. Then, the CEM is put at a thermostat and heat treated with the following multistage increase of the temperature: 20° C. for 10 minutes, then 60° C. for 40 minutes, and then 80° C. for 20 minutes. Then, the CEM is put out of the thermostat, cooled to room temperature, and the same electrode material is applied to another surface of the CEM in the same manner. The produced MEA contains CEM of CPL-1, 170 micron thick, with layers of an electrode material situated on both sides. The electrocatalyst loading is 0.3 $mg/cm^2$.

| The layers of an electrode material contains (mass %): | |
|---|---|
| Electrocatalyst | 24% |
| inactive electroconductive material | 58% |

-continued

| The layers of an electrode material contains (mass %): | |
|---|---|
| cation-exchange fluorocopolymer CPL-1 | 8% |
| Tetrafluorethylene | 10% |

The produced MEA is tested at a fuel cell in the following manner: on both surfaces of the electrode layers of the produced MEA, the carbon cloth TMP-5 (RTM) saturated with polytetrafluorethylene dispersion (TU 6-05-1246-81) is applied and then compressed. Then, the aggregate is put into the fuel cell. The test is carried out at 80° C., and the following gases are added into the fuel cell: hydrogen at the anode compartment with a pressure of 2.5 atm and oxygen to the cathode compartment with a pressure of 5 atm.

The following results are obtained:

| cell voltage | 0.77–0.78 V |
|---|---|
| current density | 0.5 A/cm$^2$ |

The fuel cell was operated stably for 3000 hours, then the test was interrupted and the MEA was put out. The exfoliation of the layer of an electrode material was not observed by visual survey. When the MEA was returned into the fuel cell its parameters did not change.

EXAMPLE 2

CEM 50 mm in diameter and thickness of 100 microns made of hydrolyzed copolymer tetrafluoroethylene with perfluorsulfur-containing vinyl ether and perfluormethylvinyl ether (CPL-8) with a degree of crystallinity of 6%, EW=1100, with cation exchange groups —SO$_3$H, is used to produce MEA.

The production of an electrode material.

0.85 g of electrocatalyst (platinum with particle size of 0.05 micron) and 0.1 g of inactive electroconductive material (acetylene black, particle size of 0.015 micron) are mixed in a glass vessel. Then 0.03 g of polytetrafluorethylene (RNS 1491-77) and 0.02 g of fluorpolymer as a 2% solution in a mixture of dimethylformamide with ethanol and freon-123B (mass ratio 1:8:1) are added to the obtained particles of platinum which were mixed with the carbon. The fluorcopolymer is identical to the CEM copolymer (CPL-8). The obtained viscous composition is applied on one of the air-dried surfaces of the CEM by drawing a layer of such thickness, that after drying, an electrocatalyst loading would be not more than 0.3 μg/cm$^2$. Then, the CEM is put into a thermostat and heated with the following multistage increase of the temperature: 20–35° C. for 10 minutes, then 50° C. for 30 minutes and then 100° C. for 30 minutes. Then, the CEM is put out of the thermostat, cooled to the room temperature, and the same electrode material is applied to another surface of the CEM in the same manner. The produced MEA contains CEM of CPL-8 100~microns thick, with the layers of an electrode material situated on both of its sides. The electrocatalyst loading is 0.3 mg/cm$^2$.

| The layers of an electrode material contains (mass %): | |
|---|---|
| electrocatalyst - | 85% |
| inactive electroconductive material - | 10% |

-continued

| The layers of an electrode material contains (mass %): | |
|---|---|
| cation exchange fluorocopolymer CPL - | 8–2% |
| polytetrafluorethylene - | 3% |

The produced MEA is tested at a fuel cell in the following manner: on both surfaces of the electrode layers of produced MEA the carbon cloth saturated with polytetrafluorethylene dispersion is applied.

The following results are obtained:

| cell voltage | 0.79–0.81 V |
|---|---|
| current density | 0.5 A/cm$^2$ |

The fuel cell was operating stable for 3000 hours, then the test was interrupted and the MEA was put out. The exfoliation of the layer of an electrode material wasn't observed by visual survey. When the MEA was returned into the fuel cell it's parameters did not change.

EXAMPLE 3

CEM 80 mm in diameter and thickness of 230~microns made of hydrolyzed copolymer tetrafluoroethylene with perfluorsulfur-containing vinyl ether (CPL-4) with a degree of crystallinity of 3%, EW=1000, with cation exchange groups —SO$_3$Na, is used to produce MEA.

The Production of an Electrode Material 0.95 g of electrocatalyst (platinum, the particle size of 0.05 μm) and 0.01 g of inactive electroconductive material (acetylene black, particle size of 0.01 micron) are mixed in a glass vessel. Then 0.04 g of fluorcopolymer TM-4 as a 1% solution in a mixture of dimethylformamide with ethanol and acetone (mass ratio 1:7:2) are added to the obtained particle's mixture. The fluorcopolymer contains —SO$_3$Na cation exchange groups. The obtained viscous composition is applied on one of the air-dried surfaces of the CEM by spraying a layer of such thickness, that after drying, an electrocatalyst loading would be not more than 0.15 μg/cm$^2$. Then, the CEM is put into a thermostat and heat treated with the following multistage increase of temperature: 20–40° C. for 15 minutes, then 70° C. for 40 minutes, and then 100° C. for 30 minutes. Then, the CEM is put out of the thermostat, cooled to room temperature, and another mixture is applied to another surface of the CEM in the same manner. The latter mixture contains 0.95 g of electrocatalyst (iridium, with a particle size of 0.01 micron) and 0.01 g of lead with oxidized surface (particle size 0.3μ) and 0.04 g of fluorcopolymer CPL-4 as a 1% solution in a mixture of dimethylformamide, ethanol and acetone (mass ratio 1:7:2). The fluorcopolymer contains —SO$_3$Na cation exchange groups.

The produced MEA contains CEM of CPL-4 230 microns thick with the layers of an electrode material situated on the both of its sides. The anode electrocatalyst loading is 0.45 mg/cm$^2$.

| The layers of an electrode material contains (mass %): | |
|---|---|
| Electrocatalyst | –95% |
| Inactive electroconductive material | –1% |
| Cation exchange fluorcopolymer CPL | –4 |

The produced MEA is tested at a water electrolysis by the following way. Current collectors made of porous titanium (porosity 26%) are applied to both sides of MEA. The assembly is packed using wo metal plates, pressed to each other with screws, immersed in a into the vessel of water and treated by current 0.5–1 A/cm$^2$ at 90° C. for 1 hour. The produced MEA is put into a cell for electrolysis of deionized water. The voltage at the cell is 1.71 V, current density 1 A/cm$^2$ and 100° C.

After the device operated stably for 2000 hours, the test was interrupted and the MEA was put out. The exfoliation of the layer of an electrode material was not observed by visual survey. When the MEA was returned into the cell, its parameters did not change.

EXAMPLE 4

CEM 50 mm in diameter and thickness of 200 microns made of hydrolyzed copolymer tetrafluoroethylene with perfluorsulfur containing vinyl ether (CPL-2) with a degree of crystallinity 7%, EW=1300, with cation exchange groups —SO$_3$K, is used to produce MEA. For production of an electrode material.

0.65 g of electrocatalyst (platinum) is deposited on the surface of 0.18 g inactive electroconductive material (acetylene black, particle size of 0.01 pm) and the particles are mixed in a glass vessel. Then 0.15 g polytetrafluorethylene and 0.02 g of fluorcopolymer CPL-2 as a 2.7% solution in a mixture of isoproranol, freon-123a and cyclohexanone (mass ratio 7:4:1) are added to the obtained particle's mixture. The fluorcopolymer contains —SO$_3$K cation exchange groups and is identical to the CEM copolymer. The obtained viscous composition is applied on one of the air-dried surfaces of the CEM by spraying a layer of such thickness, that after drying, an electrocatalyst loading of 0.3 pg/cm$^2$ would be obtained Then, the CEM is put into a thermostat and heat treated with the following multistage increase of temperature: 25° C. for 15 minutes, then 70° C. for 40 minutes and then, 95° C. for 20 minutes. Then, the CEM is put out of the thermostat, cooled to room temperature, and the same electrode material is applied to another surface of the CEM in the same manner. The produced MEA contains CEM of CPL-2 200 microns thick with the layers of an electrode material situated on both it's sides. The electrocatalyst loading is 0.3 mg/cm$^2$.

| The layers of an electrode material contains (mass %): | |
|---|---|
| electrocatalyst | –65% |
| inactive electroconductive material | –18% |
| cation exchange fluorcopolymer CPL | –2% |
| polytetrafluorethylene | –15% | the general porosity 70% with the porosity gradient 15% per 1 picometer.

The produced MEA is tested at a fuel cell by the following way. On both surfaces of the electrode layers of the produced MEA, the carbon cloth saturated with polytetrafluor ethylene dispersion (TU 6-05-1246-81) is applied and then compressed. Then, the aggregate is put into the fuel cell. The test is carried out at 80° C. and the following gases are added into the fuel cell: hydrogen at anode compartment with a pressure of 2.5 atm and oxygen to the cathode compartment with a pressure of 5 atm.

The following results are obtained:

| cell voltage | 0.77–0.78 V |
|---|---|
| current density | 0.5 A/cm$^2$ |

After the fuel cell was operated stably for 3000 hours, the test was interrupted and the MEA was put out. The exfoliation of the layer of an electrode material was not observed by visual survey. When the MEA was returned into the fuel cell, its parameters did not change.

EXAMPLE 5

CEM 50 mm in diameter and thickness of 150 microns made of hydrolyzed copolymer tetrafluoroethylene with perfluorsulfur-containing vinyl ether (CPL-3) with a degree of crystallinity 2%, EW=900, with cation exchange groups —SO$_3$H, is used to produce MEA. For the production of an electrode material.

0.1 g of electrocatalyst (platinum) is deposited on the surface of 0.3 g of inactive electroconductive material (acetylene black, particle size of 0.01 micron) and particles are mixed in a glass vessel. Then 0.06 g polytetrafluorethylene (RNS 1496-77) and 0.04 g of fluorcopolymer CPL-3 as a 5% solution in a mixture of pentane, N-propanol and N-butane (mass ratio 1:1:1) are added to the obtained particles. The fluorcopolymer contains —SO$_3$H cation exchange group and is identical to the CEM copolymer. The obtained viscous composition is applied on one of the air-dried surfaces of the CEM by drawing a layer of such thickness, that after drying, an electrocatalyst loading of 0.3 pg/cm$^2$ would be obtained. Then, CEM is put into a thermostat and heat treated with the following multistage increase of temperature: 30° C. for 20 minutes, then 55° C. for 30 minutes, and then 90° C. for 20 minutes. Then, the CEM is put out of the thermostat, cooled to room temperature, and the same electrode material is applied to another surface of the CEM in the same manner. The produced MEA contains CEM of CPL-3 150 pm thick with the layers of an electrode material situated on both of its sides. The electrocatalyst loading is 0.3 mg/cm$^2$.

The layers of an electrode material contains (mass%):

| The layers of an electrode material contains (mass %): | |
|---|---|
| electrocatalyst | 20% |
| inactive electroconductive material | 60% |
| cation exchange fluorcopolymer CPL-3 | 8% |
| polytetrafluorethylene | 12% | the general porosity 45% with the porosity gradient 10% per 1 µm.

The produced MEA is tested in a fuel cell in the following manner. On both surfaces of the MEA electrode layers, carbon sheets saturated with polytetrafluorethylene dispersion (TU 6-05-1246-81) are placed, then pressed. The assembly is put into the fuel cell. The MEA test is carried out at 80° C. and the following gases are supplied to the fuel cell: hydrogen to the anode camera with a pressure of 5 atm, oxygen to the cathode camera with a pressure of 25 atm. The following characteristics are obtained:

| | |
|---|---|
| voltage at the cell | 0.78–0.80 V |
| current density | 0.5 A/cm$^2$ |

After the fuel cell was operated stably for 3000 hours, the test was interrupted and the MEA was put out. There was no electrode material exfoliation from CEM observed by visual survey. When the MEA was returned into the fuel cell, its parameters did not change.

EXAMPLE 6

CEM 50 mm in diameter and thickness 170 microns, made of hydrolyzed copolymer of tetrafluoroethylene with perfluorsulfur-containing vinyl ester and ethylene (CPL-4) with —SO$_3$Na cation-exchange groups, with the degree of crystallinity 8%, EW=1250 is used for MEA production. To produce electrode material for a cathode 0.65 g of catalyst (platinum, size of particles 0.05 pm) and 0.34 g of acetylene black (size of particles 0.01 gym) are mixed in a glass vessel. Then 0.01 g of fluorcopolymer (CPL-4) with —SO$_3$Na cation exchange groups identical to copolymer of CEM in the form of 1.7% solution of freon-123V (RTM), ethanol and isobutylene (mass ratio 2:5:5) are added to the obtained particles. The obtained viscous composition of electrode material is applied to an air-dried surface of CEM by the method of the composition, pouring with such thickness that electrocatalyst loading would be 0.3 mg/cm$^2$. Then, CEM is put into a thermostat and heat treated with the following multistage increase of temperature: 30° C. for 20 minutes, then 50° C. for 30 minutes, then 100° C. for 15 minutes. Then CEM is tak out of the thermostat, cooled to room temperature, and another surface is covered in the same way with anode material produced as in Example 3. Then, CEM is put into a thermostat and heat-treated in the above-mentioned manner. The produced MEA contains CEM (CPL-4) with a thickness of 170 microns, with the electrode material layers covering both of its sides. The electrocatalyst loading is 0.1 mg/cm$^2$ at the cathode and 0.45 mg/cm$^2$ at the anode. These layers consist of (in mass %):

| | |
|---|---|
| electrocatalyst | 65% |
| electroconducting inactive material | 34% |
| cationic-exchange fluorcopolymer CPL-4 | 1% | and it's general porosity is 63% with gradient of porosity 13% per 1 μm.

The produced MEA is tested in electrolysis of deionized water.

Current collectors made of porous titanium are applied to MEA on both of its sides. The produced MEA is settled into the cell for electrolysis of deionized water. The cell voltage on the cell is 1.73–1.75 V and current density 1 A/cm$^2$ at a temperature of 100° C.

The electrolyzer was operated stably for 2000 hours. Then, the test was interrupted and MEA was put out. There was no electrode material exfoliation from CEM observed at visual survey. When the MEA was returned into the cell, its parameters did not change.

EXAMPLE 7

CEM 50 mm in diameter and thickness 23 microns made of hydrolyzed copolymer of tetrafluoroethylene with perfluorsulfo-group containing vinyl ether and perfluoroxalate (CPL-6) with —SO$_3$Li cation-exchange groups with a degree of crystallinity 4%, EW=1000 is used for MEA production.

To produce electrode material, 0.769 of catalyst (palladium, size of particles 0.08) and 0.159 of coal (size of particles 0.001 gym) are mixed in glass vessel. Then 0.099 of fluorcopolimer (CPL-6) with —SO$_3$Li cation-exchange groups identical to copolymer of CEM in the form of 2.65% solution of freon-122, acetone and isopropanol (mass ratio 2:7:1) are added to the obtained particles. The obtained viscous composition of electrode material is applied to an air-dried surface of CEM by the method of the composition pouring with such thickness that the electrocatalyst loading would be 0.15 mg/cm$^2$. Then, CEM is put into a thermostat and heat treated with the following multistage increase of the temperature: 20° C. for 20 minutes, 40° C. for 30 minutes. Then, CEM is put out of the thermostat and cooled to room temperature.

| Composition of cathode layer (in mass %): | |
|---|---|
| electrocatalyst | 76% |
| electroconductive inactive material | 15% |
| Cation-exchange fluorcopolymer (CPL-6) in mixture with freon-122, acetone and isopropanol | 0.5% |

The cathode has general porosity of 48% with a gradient of porosity of 9% per 1 pm.

Then 0.909 of mixed oxide IrO$_2$—RuO$_2$ with IrO$_2$ contents 80% (size of particles 0.05 μm) and 0.01 g of inactive electroconducting material —PbO$_2$ are mixed in a glass vessel. Then 0.099 of fluorcopolymer (CPL-6) with —SO$_3$Li cation-exchange groups identical to the copolymer of CEM in the form of a 2.6% solution mixed with freon-122, acetone and isopropanol (mass ratio 2:7:1) is added.

The obtained mixture is applied to another surface of CEM. Then CEM is put into a thermostat and dried as mentioned above. After that CEM is put out of the thermostat and cooled to room temperature.

| Composition of anode layer (in mass %): | |
|---|---|
| Electrocatalyst | 90% |
| Cationexchange Fluorcopolymer | 9% |
| inactive electroconducting material | 1% |

The anode catalyst loading is 0.45 mg/cm$^2$. The layer has general porosity 42% with gradient of porosity 5% per 1 μm.

The produced MEA is tested at electrolysis of deionized water.

Current collectors made of porous titanium are applied to MEA on both sides. The assembly is compressed using two metal plates, pressed with each other by screws than dived into vessel with water and treated by electric current 0.5–1 A/cm$^2$ at 90° C. for 1 hour. The produced MEA is settled into the cell for electrolysis of deionized water. The cell voltage is 1.76 V and current density 1 A/cm$^2$ at 100° C.

The electrolyzer was operated stably for 2000 hours, then the test was interrupted and MEA was put out. There was no electrode material exfoliation from CEM observed at visual survey. When the MEA was returned into the cell it's parameters did not change.

EXAMPLE 8

CEM 50 mm in diameter and thickness 180 microns made of hydrolyzed copolymer of tetrafluoroethylene with perfluorsulfur-containing vinyl ester and perfluorinated vinyl ether (CPL-9) with —$SO_3K$ cation-exchange groups with the degree of crystallinity 7.5%, EW=1150 is used for MEA production. To produce electrode material, 0.9 g of catalyst (mixture of platinum and ruthenium, size of particles 0.05 pm) and 0.03 g of coal (particle size of 0.001 micron) are mixed in glass vessel. Then 0.078 of cationexchange fluorcopolymer (CPL-9) with $SO_3K$ cationexchange groups—identical to copolymer of CEM in the form of 4.0% solution of freon-113, ethanol and cyclohexanol (mass ratio 1:10:1) are added to the obtained particles. The obtained viscous composition of electrode material is applied to an air-dried surface of CEM by the method of the composition drawing with such thickness that electrocatalyst loading would be 0.15 mg/cm². Then, CEM is put into a thermostat and heat treated with the following multistage increase of the temperature: at 20° C. during 20 minutes, at 60° C.—20 minutes, at 90° C.—30 minutes. Then, CEM is put out of the thermostat and cooled to room temperature. Another surface is covered in the same way by anode material which consists of 0.9 g of catalyst [mixed oxide $IrO_2+PbO_2(PbO_2-5\%)$ with particle size of 0.03 pm] and 0.03 g of oxidized lead (particle size of 0.08 pm) and 0.07 g of cation-exchange fluorcopolymer (CPL-9) with —$SO_3K$ cation-exchange groups identical to copolymer of CEM as a 4.0% solution of freon-113, ethanol and cyclohexanol (mass ratio 1:10:1). The anode electrocatalyst loading is 0.45 mg/cm². The produced MEA contains CEM made of copolymer (CPL-9) with a thickness of 180 pm. These layers consist of (in % mass)

| | |
|---|---|
| electrocatalyst | 90% |
| electroconductive inactive material | 3% |
| cationexchange fluorcopolymer (SPL-9) | 7% |

The cathode layer general porosity is 50% with gradient of porosity 7% per 1 pm and the anode layer general porosity is 56% with a gradient of porosity of 12% per 1 pm.

The produced MEA is tested at electrolysis of deionized water.

Current collectors made of porous titanium are applied to MEA on the both sides. The assembly is compressed using two metal plates, pressed to each other with screws dived into vessel with water and treated by electric current 0.5–1 A/cm² at 90° C. for 1 hour. The produced MEA is settled into the cell for electrolysis of deionized water. The cell voltage is 1.72–1.74 V and current density 1 A/cm² at 100° C.

The electrolyzer was operated stably for 2000 hours. Then, the test was interrupted and MEA was put out. There was no electrode material exfoliation from CEM observed at visual survey. When the MEA was returned into the cell it's parameters did not change.

EXAMPLE 9

CEM 50 mm in diameter and 150 mm thick made of hydrolyzed copolymer of tetrafluoroethylene with perfluorsulfur-containing vinyl ether and perfluordioxalate (CPL-7) with $SO_3H$ cation-exchange groups, with a degree of crystallinity of 1%, EW=850 is used for MEA production. To produce electrode material, 0.91 g of catalyst (palladium, particle size of 0.08 pm) and 0.09 g of fluorcopolymer (CPL-7) with —$SO_3H$ cation-exchange groups identical to the copolymer of CEM in the form of 5% solution of freon-122a (RTM), methylethylcetone and isobutanol (mass ratio 1:1:9) are added to the obtained particles. The obtained viscous compound of electrode material is applied to an air-dried surface of CEM by the method of the composition by pouring with a thickness such that electrocatalyst loading would be 0.15 mg/cm² after drying. Then, CEM is put into a thermostat and heat-treated with the following multistage increase of the temperature: 20° C. for 10 minutes, at 40° C. for 20 minutes, and 100° C. for 30 minutes. Then, CEM is put out of the thermostat and cooled to room temperature. Another surface is covered in the same way with the following mixture: 0.91 g of catalyst (mixed $IrO_2$ +$RuO_2$+ $SnO_2$, mass ratio 80:15:5, particle size of 0.05) and 0.09 g of fluorcopolymer (CPL-7) with —$SO_3H$ cation-exchange groups identical to the copolymer of CEM in the form of a 5% solution of freon-122a, methylethylcetone and isobutanol (mass ratio 1:1:9). The obtained compound is applied to another surface of CEM. Then, CEM is put into a thermostat and heat-treated as described above. Anode electrocatalyst loading is 0.45 mg/cm². Produced MEA contains CEM made of copolymer (CPL 7) with a thickness of 150 microns and layers of electrode material covering both surfaces of CEM. These layers consist of (in mass %):

| | |
|---|---|
| electrocatalyst | 91% |
| electroconducting inactive material | 0% |
| cationexchange fluorcopolymer (CPL-7) | 9% | with a general porosity of 61% with a gradient of porosity of 13% per 1 $\mu$m.

The produced MEA is tested at electrolysis of deionized water.

Current collectors made of porous titanium are applied to both sides of the MEA. The assembly is compressed using two metal plates, pressed together with screws then submerged into a vessel with water and treated by an electric current of 0.5–1 A/cm² at 90° C. for 1 hour. The produced MEA is settled into the cell for electrolysis of deionizated water. The cell voltage is 1.82–1.84 V and current density 1 A/cm² at 100° C.

The electrolyzer was operated stably for 2000 hours. Then, the test was interrupted and MEA was put out. There was no electrode material exfoliation from CEM observed by visual survey. After the MEA was returned to the cell the voltage increased to 1.86–1.88 V.

Example 9 shows that if the MEA does not have the claimed composition has worse parameters.

CONTROL EXAMPLE 1

CEM 50 mm in diameter and 300 Vm thick made of hydrolyzed copolymer of tetrafluoroethylene with perfluorsulfur-containing vinyl ether (RTM MF4-SK) with —$SO_3H$ cation-exchange groups with the degree of crystallinity of 12%, EW=1200 is used for MEA production. To produce electrode material, 0.58 of catalyst (platinum, size of particles 0.05 pm) and 0.0558 of copolymer (MF-4 SK) with —$SO_3H$ cation-exchange groups identical to the copolymer of CEM as a 1.8% solution are combined in a glass vessel, with a mixture of dimethylacetamide, ethanol and acetone (mass ratio 1:7:2). The obtained viscous composition of electrode material is applied to one of an air-driedsurface of CEM by the method of drawing with such a thickness that electrocatalyst loading would be 0.15 mg/cm². Then, CEM is put into a thermostat and heat treated with the following multistage increase of the temperature: at 20–35° C. for 15 minutes, at 70° C.—40 minutes, at 100° C.—30 minutes. Then, the CEM is put out of the thermostat and cooled to room temperature. The composition of cathode layer (in mass %):

| electrocatalyst | 91% |
|---|---|
| cationexchange fluorcopolymer identical to copolymer of CEM | 9% |

The cathode has a general porosity of 26% with a gradient of porosity of 0% per 1 μm.

0.58 of iridium (particle size of 0.01 pm) and 0.0558 of copolymer (RTM MF-4 SK) with —$SO_3H$ cation-exchange groups identical to copolymer of CEM in the form of a 1.8% solution in a mixture of dimethylacetamide, ethanol and acetone (mass ratio 1:7:2) are mixed in glass vessel. Obtained viscous compound of electrode material is applied to another air-dried surface of CEM with the method of pouring with such thickness that electrocatalyst loading would be 0.45 mg/cm². Then, CEM is put into a thermostat and heat-treated as mentioned above. The composition of anode layer (in mass %):

| Electrocatalyst | 91% |
|---|---|
| Cation-exchange fluorcopolymer identical to Copolymer of CEM | 9% |

The cathode has a general porosity of 26% with a gradient of porosity of 0% per 1 μm.

The produced MEA is tested by water electrolysis.

Current collectors made of porous titanium are applied to both sides of MEA. The assembly is compressed using two metal plates, pressed together with screws submerged into a vessel with water and treated by electric current 0.5–1 A/cm² at 90° C. for 1 hour. The produced MEA is settled into the cell for electrolysis of deionized water. The cell voltage is 1.91 V and current density 1 A/cm² at 100° C.

The electrolyzer was operating for 1000 hours with the increase of the voltage to 1,95 V and than the test was interrupted and MEA was put out. Tendency for exfoliation of electrode layer was found at visual survey. After the MEA was returned to the cell the voltage increased up to 2.03 V.

CONTROL EXAMPLE 2

CEM 50 mm in diameter and thickness 140 pm (in solid state) made of hydrolyzed copolymer tetrafluoroethylene with perfluorsulfur-containing vinyl ester (trademark Nafion-117) with —$SO_3K$ cation-exchange groups with a degree of crystallinity of 12%, EW=1100 is used for MEA production.

For electrode material production, 0.1 g (20% mass) of catalyst (platinum, particle size of 0.05 μm), 0.3 g of coal (average particle size, 25A) and 0.1 g of fluorcopolymer as a 5% solution (trademark Nafion solution) in isopropanol (mass ratio 3:1:1) are mixed in a glass vessel. The fluorcopolymer contains —$SO_3H$ groups identical to those of the CEM The composition is stirred into homogeneous state. Then, the obtained viscous composition was processed with a 5% solution of KOH to transform the —$SO_3H$ groups of copolymer transformation to $SO_3K$ groups. The obtained paste was uniformly applied to one of the CEM surfaces using a device with an aperture for paste extrusion so that the electrode layer thickness was 10 μm. Then, CEM covered with a catalytic layer was dried at room temperature (20° C.) for 10 minutes, then at room temperature and a pressure of 10 mm of Hg for 30 minutes. The produced CEM with the electrode material layer, was placed between teflon plates 10 mm in thickness then treated by electric heater to 190° C. and compressed at 190° C. and 50 kg/cm² for 30 minutes. Then, the assembly was cooled, CEM was put out and another surface was covered in the same way with the same electrode material. The electrode material was fixed as mentioned above. The produced MEA contains CEM (trademark Nafion-117) with —$SO_3K$ cation-exchange groups, with electrode material layers on both surfaces so that electrode material loading would be 0.3 mg/cm². Electrode material contains (in mass %):

| electrocatalyst | 20% |
|---|---|
| inactive electroconductive material | 60% |
| Cation-exchange copolymer identical to copolymer (trademark Nafion-117) with —$SO_3K$ cation exchange groups | 20% |

Produced MEA is submerged into a 3% solution of sulphuric acid at room temperature for 16 hours. —$SO_3K$ groups are transformed into —$SO_3H$. The MEA has a general porosity of 29% with a gradient of porosity 0% per 1 pm.

The produced MEA is tested at a fuel cell in the following way. On both surfaces of MEA electrode layers, carbon sheets saturated with polytetrafluorethylene dispersion (TU 6-05-1246-81) were placed, then compressed. The assembly is put into the fuel cell. MEA test is carried out at 80° C. and the following gases are supplied at the fuel cell: hydrogen— to the anode compartment at a pressure of 2.5 atm, oxygen to the cathode compartment at a pressure of 5 atm. The following characteristics are obtained:

| voltage at the cell | 0.72–0.75 V |
|---|---|
| current density | 0.5 A/cm² |

The electrolyzer was operating stably for 1000 hours. The test was interrupted and MEA was put out. Electrode layer exfoliation was found upon visual survey. After the MEA was returned to the cell, the voltage was reduced to 0.65 V.

As shown in the given examples, the claimed MEA has better electrochemical characteristics than already known MEAs. Thus, when using the claimed MEA in a fuel cell its voltage is 0.77–0.8 V and current density 0.5 A/cm². The cell voltage is not more than 0.75 V and current density 0.5 A/cm² for MEA obtained by the prototype at low catalyst loading.

Because of its low resistance and efficient catalyst loading at water electrolysis, the claimed MEA has a voltage of not more than 1.75 V. That is less than the voltage of known MEAs with the same electrocatalyst loading.

The claimed method of MEA production that can be used in a fuel cell and electrolysis of water is not complicated, takes less time and does not damage CEM. Also, strong adhesion between the electrode layer and CEM is achieved. Particles of the catalyst are not capsulated by fluorpolymeric binder. They are uniformly distributed throughout the volume of the electrode layer. This contributes to efficient catalyst loading, and increases the life-time of fuel cells and electrolyzers especially if they are assembled and disassembled (for repair for example) during the operation.

What is claimed is:

1. Membrane-electrode assembly that consists of a fluorocontaining cation-exchange membrane having two surfaces, wherein the membrane is made of a hydrolyzed copolymer of tetrafluoroethylene and a perfluorsulfur-contaning vinyl ether having a value of EW=equal to 900–1300 and porous electrode material layers made of an electrocatalyst, an electroconductive inactive material and fluoropolymeric binder situated on both surfaces of the cation exchange membrane, wherein the fluorocontaining cation exchange membrane is produced from a hydrolyzed copolymer of tetrafluoroethylene with a perfluorsulfur-containing vinyl ether having a degree of crystallinity of 2–8%, and wherein the porous electrode material layers are each produced with porosity 40–70%, wherein the porosity of each layer decreases in the direction of the respective cation exchange membrane surface with a gradient of 5–15% per $1\mu$.

2. Membrane-electrode assembly in accordance with claim 1, wherein the fluoro-containing cation exchange membrane is produced from the hydrolyzed copolymer of tetrafluoroethylene, the perfluorsulfur-containing vinyl ether and a third modifying comonomer selected from the group consisting of ethylene, perfluoro-2-methylen-4-methyl-1,3-dioxolane, and perfluoralkylated vinyl ether with a $C_1$–$C_3$ alkyl-group.

3. Membrane-electrode in accordance with claim 1, wherein the electrode material porous layers are produced from of a mixture containing 20%–85% by mass of the electrocatalyst, 10%–60% by mass of the electroconductive inactive material, and 2%–8% by mass of the fluoropolymeric binder, wherein the fluoropolymeric binder is identical to the hydrolyzed copolymer, and the fluoropolymeric binder contains 3%–15% by mass of polytetrafluorethylene.

4. Membrane-electrode assembly in accordance with claim 1 or 2 wherein the electrode material porous layers are produced from a mixture containing 65%–95% by mass of the electrocatalyst, 1%–35% by mass of the electroconducting inactive material, and 1%–9% by mass of the fluoropolymeric binder, wherein the fluoropolymeric binder is identical to the hydrolyzed copolymer, and the fluoropolymeric binder contains 3%–15% by mass of polytetrafluorethylene.

5. A method for membrane electrode assembly production, comprising (A) applying a mixture of an electrocatalyst, an electroconducting inactive material, and a fluoro-containing polymeric binder to a first surface of a cation-exchange membrane having two surfaces to form an electrode material layer situated on the first surface, wherein the membrane is produced from a hydrolyzed copolymer of tetrafluoroethylene and a perfluorsulfur-containing vinyl ether having a value of EW=equal to 900–1300, wherein the hydrolyzed copolymer of tetrafluorethylene and the perfluorsulfur-containing vinyl ether, has degree of crystallinity 2–8%, wherein the fluoro-containing polymer binder is in a 1–5% solution of inorganic solvents and is identical to the hydrolyzed copolymer; and B heat-treating with multistage increases of temperature from 20–35° C. to 80–100° C., wherein the electrode material layer has a porosity which decreases towards the first surface of the cationic exchange membrane at a rate of 5–15% per 1 $\mu$m.

6. The method of claim 5, wherein the cation exchange membrane is produced from a hydrolyzed copolymer of tetrafluoroethylene a perfluorosulfur-containing vinyl ether and third modifying comonomer selected from the group consisting of ethylene, perfluoro-2-methylen-4-methyl-1,3-dioxalane and perfluoralkylated vinyl ether with a $C_1$–$C_4$ alkyl-group.

7. The method of claim 5 or 6, wherein the mixture of the electrocatalyst, the electroconducting inactive material and the 1–5% solution of the fluoro-containing polymer binder is applied to both sides of the cation exchange membrane, and the fluoropolymeric binder is identical to the hydrolyzed copolymer.

* * * * *